United States Patent [19]

Olaussen et al.

[11] Patent Number: 5,149,370
[45] Date of Patent: Sep. 22, 1992

[54] WELL CEMENT COMPOSITIONS HAVING IMPROVED PROPERTIES AND METHODS

[75] Inventors: Stein Olaussen, Hafrsfjord; Audun Bjordal, Esbjerg; Geir Solland, Sandnes, all of Norway

[73] Assignee: Halliburton Company, Duncan, Okla.

[21] Appl. No.: 779,673

[22] Filed: Oct. 21, 1991

[51] Int. Cl.$^5$ ............ C04B 9/12; C04B 7/00; C04B 40/00
[52] U.S. Cl. .................... 106/737; 106/713; 106/724; 106/819; 106/823; 166/293; 166/294; 405/266; 507/106; 507/107; 507/120; 507/121; 507/108
[58] Field of Search ............ 106/713, 719, 721, 737, 106/819, 823; 166/292, 293, 294; 405/266; 252/8.51, 8.512, 8.551

[56] References Cited

U.S. PATENT DOCUMENTS

Re. 32,742  9/1988  Skjeidal .................. 106/98
4,935,060  6/1990  Dingsoyr ................. 106/719

FOREIGN PATENT DOCUMENTS 41056  5/1981  European Pat. Off. .
2179933  10/1988  United Kingdom .

OTHER PUBLICATIONS

"Hawley's Condensed Chemical Dictionary", 11th Edition, 1987, Reinhold Company, Inc., p. 1038.
E. Grabowski and J. E. Gillott, "Effect of Replacement of Silica Flour With Silica Fume on Engineering Properties of Oilwell Cements at Normal and Elevated Temperatures and Pressures", Cement and Concrete Research, vol. 19, pp. 333–344 (1989).
M. Grinrod, B. Vassoy and E. O. Dingsoyr, "Development and Use of a Gas-Tight Cement", IADC/SPE 17258 (1988).

Primary Examiner—William R. Dixon, Jr.
Assistant Examiner—Michael Marcheschi
Attorney, Agent, or Firm—Thomas R. Weaver

[57] ABSTRACT

Cement compositions which have improved properties such as increased stability, reduced settling tendencies, enhanced fluid loss properties and the like and methods of using such cement compositions are provided. The cement compositions are comprised of water, hydraulic cement and an aqueous colloidal silicic acid suspension wherein the colloidal silicic acid particles have a specific surface area in the range of from about 50 $m^2/g$ to about 1000 $m^2/g$.

19 Claims, No Drawings

WELL CEMENT COMPOSITIONS HAVING IMPROVED PROPERTIES AND METHODS

BACKGROUND OF THE INVENTION

1. Field of the Invention

The present invention relates to improved cement compositions and methods of using the compositions in cementing oil and gas wells.

2. Description of the Prior Art

In cementing operations carried out in oil, gas and other wells, a hydraulic cement and various additives are mixed with sufficient water to form a pumpable slurry, and the slurry is pumped into a subterranean zone to be cemented by way of the well bore penetrating the zone. After placement, the cement slurry sets into a hard mass.

In primary cementing whereby casing and/or one or more liners are bonded within the well bore, the cementing is accomplished by introducing a cement composition into the annular space between the casing and/or liners and the well bore. Generally, the cement composition is pumped downwardly within the casing and/or liners to the bottom thereof and then upwardly into the annulus.

In wells which are drilled into or through high pressure formations, it is necessary that the cement compositions used in carrying out cementing operations in the formations have high densities in order to provide high hydrostatic pressure and to thereby prevent blow-outs. In wells which are drilled into or through low pressure formations, it is generally inadvisable to expose the formations to high hydrostatic pressures in that the formations may break down and the cement compositions lost. Thus, in cementing wells drilled into and through low pressure formations, lightweight cement compositions are advantageously utilized.

In most wells, one or more of the subterranean formations penetrated by the well bore contain gas under pressure. When primary cementing operations are carried out in the annulus, the gas may penetrate the cement composition whereby gas migration occurs. Gas migration generally starts during the setting process of the cement composition, i.e., during the time the cement composition changes from a hydrostatic fluid to a solid state body. If the cement composition is not able to resist the gas pressure during the setting process, channels can be formed in the partially cured composition whereby gas flows through the column between formations and/or to the surface.

In order to produce both heavyweight and lightweight cement compositions having improved properties whereby the compositions resist gas migration, have low strength retrogression at high temperatures and do not readily settle or segregate, finely divided amorphous silica dust has heretofore been included in the cement compositions. For example, U.S. Pat. No. 32,472 issued on Sep. 6, 1988 discloses a lightweight well cement composition in which amorphous silica dust obtained during the electrothermal preparation of ferrosilicon or the like is included therein. Such silica dust particles typically have specific surface areas of from about 18 to about 22 square meters per gram ($m^2/g$). Upon and during hardening, the cement composition is substantially gas tight (prevents gas migration) and provides high compressive strength.

U.S. Pat. No. 4,935,060 issued Jun. 19, 1990 discloses a high density hydraulic cement composition which is gas tight, has a very low strength retrogression at high temperature and has substantially no tendency to settle or segregate. The cement composition contains amorphous silica dust particles which have a specific surface area in the range of from about 15 $m^2/g$ to about 30 $m^2/g$.

While the foregoing and other prior art cement compositions have achieved varying degrees of success, there is a need for improved cement compositions having both low and high densities which have reduced settling tendencies, better strengths, enhanced fluid loss properties and which prevent gas migration.

SUMMARY OF THE INVENTION

By the present invention improved well cement compositions and methods of using such compositions are provided which overcome the shortcomings of the prior art and meet the need described above. The improved cement compositions of this invention are comprised of water, hydraulic cement and an aqueous colloidal silicic acid suspension wherein the colloidal silicic acid particles in the suspension have specific surface areas in the range of from about 50 $m^2/g$ to about 1000 $m^2/g$, more preferably in the range of from about 300 $m^2/g$ to about 700 $m^2/g$ and most preferably about 500 $m^2/g$. The aqueous colloidal silicic acid suspension additive contains silicic acid particles, expressed as silica, in an amount in the range of from about 2% to about 60% silica by weight of the suspension, more preferably from about 4% to about 30% silica by weight and most preferably about 15% silica by weight.

The improved cement compositions of this invention also preferably include fluid loss control additives, and optionally, set retarding additives therein. Methods of using the cement compositions for cementing subterranean zones penetrated by well bores are also provided.

It is, therefore, a general object of the present invention to provide well cement compositions having improved properties and methods of using such cement compositions.

A further object of the present invention is the provision of well cement compositions and methods of using the compositions wherein the compositions are gas tight, have reduced settling tendencies, have better strengths and have enhanced fluid loss properties.

Other and further objects, features and advantages of the present invention will be readily apparent to those skilled in the art upon a reading of the description of preferred embodiments which follows.

DESCRIPTION OF PREFERRED EMBODIMENTS

The improved well cement compositions of the present invention are pumpable aqueous hydraulic cement slurries comprised of components which make the compositions substantially gas tight, i.e., impervious to gas migration, highly stable, i.e., very little or no settling of solids or separation of free water takes place, have very low fluid loss and have excellent gel and compressive strengths. The cement compositions are basically comprised of hydraulic cement, sufficient water to form a pumpable slurry and an aqueous colloidal silicic acid suspension.

While various hydraulic cements can be utilized in forming the compositions, Portland cement is preferred and can be, for example, one or more of the various Portland cements identified as API Classes A through H and J cements. These cements are defined in the "API Specification for Materials and Testing for Well Cements", API Specification 10 of the American Petroleum Institute.

The water used can be fresh water, saturated or unsaturated salt water or seawater, and is generally present in the cement compositions in an amount of from about 30% to about 60% by weight of the dry cement utilized. However, as will be understood, under particular circumstances the particular quantity of water used can vary from the aforesaid amounts.

The aqueous colloidal silicic acid suspension included in the cement compositions in accordance with this invention preferably contains silicic acid particles, expressed as silica, in an amount in the range of from about 2% to about 60% silica by weight of solution, more preferably from about 4% to about 30% silica by weight. The silicic acid particles in the suspension are generally of a size under about 20 nanometers (nm), more preferably a size ranging from about 10 nm down to about 1 nm. The specific surface area of the particles is in the range of from about 50 m$^2$/g to about a 1000 m$^2$/g, more preferably from about 300 m$^2$/g to about 700 m$^2$/g. The silicic acid suspension is preferably stabilized with an alkali whereby it has a molar ratio of SiO$_2$ to M$_2$O (wherein M is an ion selected from Na, K, Li and NH$_4$) of from about 10:1 to about 300:1, more preferably of from about 15:1 to about 100:1. Generally, the aqueous silicic acid suspension employed includes silicic acid particles which have a maximum active surface area and a well defined small size averaging from about 4 nm to about 9 nm.

A particularly preferred aqueous colloidal silicic acid suspension is one wherein the silicic acid particles have an average specific surface area of about 500 m$^2$/g, the particles have an average size of about 5.5 nm and the suspension contains silicic acid particles, expressed as silica, in an amount of about 15% silica by weight of the suspension.

The aqueous silicic acid suspension is generally included in a cement composition of this invention in an amount in the range of from about 1.0% to about 30% by weight of dry cement in the composition. When the aqueous silicic acid suspension is utilized in lightweight cement compositions, greater amounts of the suspension are generally used as compared to when the aqueous silicic acid suspension is included in other cement compositions to make them gas tight, improve their stabilities, etc. Because of the very high specific surface area and small size of the colloidal silicic acid particles, a much smaller quantity of such particles are required in cement compositions to produce the desired results as compared to heretofore used fine silica cement composition additives. In addition, because the colloidal silicic acid particles are suspended in an aqueous medium, the particles are readily added to and dispersed in a cement composition using a minimum of mixing. When the most preferred aqueous silicic acid suspension described above wherein the suspension contains silicic acid particles having an average specific surface area of about 500 m$^2$/g in an amount equivalent to about 15% silica by weight of the suspension is used, it is included in a cement composition in an amount in the range of from about 2% to about 15% by weight of cement in the composition, more preferably in an amount of about 10% by weight of cement in the composition.

The cement compositions of the present invention also preferably include fluid loss control additives which reduce fluid losses from the cement compositions into surrounding subterranean formations or zones. While a variety of fluid loss control additives well known to those skilled in the art can be utilized, a particularly suitable such additive is comprised of a graft lignin or lignite polymer of the type disclosed in U.S. Pat. No. 4,676,317 issued Jan. 30, 1987. Generally, such a graft polymer is comprised of a backbone of at least one member selected from the group consisting of lignin, lignite and their salts, and a grafted pendant group comprising at least one member selected from the group consisting of 2-acrylamido-2-methylpropanesulfonic acid (AMPS®), acrylonitrile, N,N-dimethylacrylamide, acrylic acid and N,N-dialkylaminoethylmethacrylate wherein the alkyl radical is selected from methyl, ethyl and propyl radicals.

Another preferred fluid loss additive is an aqueous solution of the reaction product of polyethyleneimine and one or more sulfonated organic compounds described in U.S. Pat. No. 4,742,094 issued May 3, 1988. Generally, the fluid loss additive is comprised of an aqueous solution of the reaction product formed by admixing polyethyleneimine having a molecular weight above about 50,000 and sulfonated organic compounds comprising an admixture of lignosulfonic acid salts having Na, Ca or NH$_4$ as the associated cation, together with naphthalene sulfonic acid condensed with formaldehyde having a molecular weight above about 5000. The ratio by weight of the polyethyleneimine to the sulfonated compounds is in the range of from about 1:1.4 to about 7.5:1, and the ratio by weight of the lignosulfonic acid salt to the naphthalene sulfonic acid condensed with formaldehyde is in the range of from about 1:5 to about 5:1.

Yet another preferred fluid loss additive is the copolymer or copolymer salt of 2-acrylamido, 2-methylpropanesulfonic acid (AMPS®) and N,N-dimethylacrylamide (NNDMA) described in U.S. Pat. No. 4,555,269 issued Nov. 26, 1985. Generally, the copolymer or copolymer salt has a ratio of AMPS® to NNDMA of between 1:4 to 4:1.

The above described graft lignin or lignite polymer is generally added to a cement composition of the present invention in an amount of about 0.25% to about 5% by weight of the dry cement in the composition. When the aqueous solution of the reaction product of polyethyleneimine and one or more sulfonated organic compounds is utilized, it is generally added to the cement composition in an amount in the range of from about 2.5% to about 10% by weight of dry cement in the composition. When the AMPS®—NNDMA copolymer or copolymer salt is used, it is added to the cement composition in an amount of about 0.1% to about 1.5% by weight of cement.

In some applications, e.g., when the cement composition is utilized in a hot deep well, it is necessary or desirable that a set retarding additive be included in the cement composition. The addition of a set retarder to a cement composition increases the time from when the composition is prepared to when it sets thereby allowing it to be pumped for a longer period of time, etc. A variety of set retarding additives well known to those skilled in the art can be utilized in the cement compositions of this invention. A preferred set retarding additive which allows rapid development of cement compressive strength after placement is comprised of a copolymer of 2-acrylamido, 2-methylpropane-sulfonic acid (AMPS®) and acrylic acid. The copolymer generally comprises from about 40 to about 60 mole percent AMPS® with the balance comprising acrylic acid. It preferably has an average molecular weight below about 5000 such that a 10% aqueous solution of the copolymer has a Brookfield viscosity reading at 20 rpm of the U.L. adapter spindle in the range of from about 2 to less than 5 centipoise. Preferably, the copolymer comprises from about 45 to about 55 mole percent AMPS®, and most preferably about 50 mole percent AMPS®. Other set retarding additives which can be used are lignosulfonates, borates or organic acids such as gluconic acid, citric acid and the like. Of these, a set retarder comprised of lignosulfonate is preferred.

When a set retarding copolymer of AMPS® and acrylic acid is utilized, it is preferably included in a cement composition of this invention in an amount in the range of from about 0.1% to about 5.0% by weight of dry cement utilized. When a lignosulfonate set retarding additive is used, it is also preferably included in the cement composition in an amount of about 0.1% to about 5.0% by weight of dry cement utilized. In both cases, in order to enhance the set retarding ability of the set retarding additives, a set retarder intensifier such as tartaric acid or a salt thereof can be included in the cement composition in an amount in the range of from about 0.2% to about 5.0% by weight of dry cement used. When a lignosulfonate set retarding additive is included in the cement compositions of the present invention, a tartaric acid intensifier is also preferably included.

A well cement composition of the present invention having improved properties is comprised of water, hydraulic cement and an aqueous colloidal silicic acid suspension wherein the colloidal silicic acid particles in the suspension have specific surface areas in the range of from about 50 m$^2$/g to about 1000 m$^2$/g, more preferably from about 300 m$^2$/g to about 700 m$^2$/g, and most preferably about 500 m$^2$/g. The aqueous colloidal silicic acid suspension preferably contains silicic acid particles, expressed as silica, in an amount in the range of from about 4% to about 30% SiO$_2$ by weight of the suspension, most preferably 15% by weight.

When a fluid loss control additive is included in the cement composition to reduce fluid loss, the additive is preferably selected from the group consisting of a graft lignin or lignite polymer, an aqueous solution of the reaction product of polyethyleneimine and one or more sulfonated organic compounds and a copolymer or copolymer salt of 2-acrylamido, 2-methylpropanesulfonic acid and N,N-dimethylacrylamide. The fluid loss control additive is added to the cement composition in an amount in the range of from about 0.1% to about 10% by weight of the dry cement therein.

When a set retarding additive is included in the cement composition, it is preferably selected from the group consisting of lignosulfonate plus tartaric acid and a copolymer of 2-acrylamido, 2-methylpropanesulfonic acid and acrylic acid. The set retarding additive is included in the cement composition in an amount in the range of from about 0.1% to about 10% by weight of dry cement utilized.

In accordance with the improved methods of the present invention for cementing in a subterranean zone penetrated by a well bore, an improved pumpable cement composition of this invention is first formed, followed by pumping the cement composition into the subterranean zone by way of the well bore. As indicated above, when placed in subterranean zones, the improved cement compositions of this invention are gas tight, i.e., prevent gas migration prior to and after setting, and have outstanding stability. When the compositions are utilized at low temperatures and have relatively high water-cement ratios, the presence of the aqueous colloidal silicic acid suspension accelerates the setting of the cement compositions.

In order to further illustrate the improved cement compositions and methods of the present invention, the following examples are given.

EXAMPLE 1

A number of test cement slurries were prepared utilizing API Class G Portland cement. The slurries were prepared by dry blending the dry components with the cement prior to the addition of water. Fresh water (except where noted differently) was then mixed with the dry blends to form slurries in a Waring blender. The test slurries produced are described in Table I below.

The rheologies and gel strengths of the slurries were determined using a Fann Model 35 viscometer in accordance with the "API Specification for Materials and Testing for Well Cements", API Specification 10, of the American Petroleum Institute. In addition, thickening time, fluid loss and free water tests were run in accordance with the above mentioned API Specification at a bottom hole circulating temperature (BHCT) of 77° F. The rheology and gel strength test results are given in Table II below and the thickening time, fluid loss and free water tests are given in Table III below.

TABLE I

| Test Cement Slurry No. | Dispersant[1], %[2] | Fluid Loss Control Additive[3], % | Aqueous Colloidal Silicic Acid Suspension[4], gal/sk[5] | Water Ratio, gal/sk | Slurry Specific Gravity |
|---|---|---|---|---|---|
| 1[6] | — | — | 0.51 | 11.70 | 1.5 |
| 2 | — | — | 0.68 | 11.66 | 1.5 |
| 3[7] | — | — | 0.68 | 12.49 | 1.5 |
| 4 | — | — | 0.68 | 12.06 | 1.5 |
| 5 | 0.5 | 0.5 | 0.79 | 9.79 | 1.56 |
| 6 | 0.5 | 0.5 | 0.79 | 9.77 | 1.56 |
| 7 | 0.7 | 0.7 | 1.01 | 9.65 | 1.56 |
| 8 | 0.7 | 0.7 | 1.13 | 9.34 | 1.56 |
| 9 | 0.7 | 0.7 | 1.13 | 9.56 | 1.56 |

[1]Polymeric additive disclosed in U.S. Pat. No. 4,557,763 issued December 10, 1985.
[2]All percentages are by weight of dry cement.
[3]Copolymer of AMPS® and N,N-dimethylacrylamide.
[4]Contains silicic acid particles of 500 m$^2$/g ave. spec. surface area in an amount of 15% silica by weight.
[5]Gallons per 96 pound sack of cement.
[6]Some settling exhibited.
[7]Sea water used.

TABLE II

| Test Cement Slurry No. | Temp., °F. | Fann Readings at rpm | | | | | | | | | Gel Strength | |
| | | 300 | 200 | 180 | 100 | 90 | 60 | 30 | 6 | 3 | 10 sec | 10 min |
|---|---|---|---|---|---|---|---|---|---|---|---|---|
| 1 | 77 | 16.5 | 14 | 13 | 11 | 10.5 | 9 | 8 | 8 | 7 | — | — |
| 2 | 77 | 22 | 19 | 18.5 | 16 | 15 | 14 | 12.5 | 11 | 10 | 10.5 | 14.5 |

TABLE II-continued

| Test Cement Slurry No. | Temp., °F. | Fann Readings at rpm | | | | | | | | | Gel Strength | |
|---|---|---|---|---|---|---|---|---|---|---|---|---|
| | | 300 | 200 | 180 | 100 | 90 | 60 | 30 | 6 | 3 | 10 sec | 10 min |
| 3 | 77 | 25 | 22 | 21 | 18 | 17 | 16 | 15 | 13 | 11 | 15 | 24 |
| 4 | 77 | 20 | 17 | 17 | 14 | 14 | 13 | 12 | 11 | 9 | 7 | 12 |
| 5 | 77 | 52 | 50 | 48 | 49 | 48 | 49 | 51 | 57 | 55 | 33 | 41 |
| 6 | 77 | 32 | 23 | 21 | 14 | 13 | 9.5 | 6 | 2 | 1 | 2 | 3 |
| 7 | 77 | 47 | 34.5 | 32 | 21 | 19 | 14 | 9 | 3 | 2 | 2.5 | 5 |
| 8 | 77 | 47 | 35 | 32 | 21 | 20 | 15 | 9 | 5 | 3 | 3 | 5 |
| 9 | 77 | 70 | 66 | — | 69 | — | — | — | 93 | 91 | 60 | — |

TABLE III

| Test Cement Slurry No. | Thickening Time, hrs:mins | Fluid Loss, ml/30 min | Free Water, % |
|---|---|---|---|
| 1 | 5:00 | — | 3.2 |
| 2 | — | — | 1.9 |
| 3 | 5:00+ | — | 0.9 |
| 4 | — | — | 1.0 |
| 5 | — | — | — |
| 6 | — | — | — |
| 7 | 5:48 | 34 | 0 |
| 8 | 4:26 | — | — |
| 9 | — | — | — |

Table V below and thickening time, fluid loss and free water tests at a BHCT of 77° F. are set forth in Table VI.

TABLE IV

| Test Cement Slurry No. | Dispersant[1], %[2] | Fluid Loss Control Additive[3], gal/sk[4] | Aqueous Colloidal Silicic Acid Suspension[5], gal/sk | Set Retarder[6], gal/sk | Set Retarder[7], gal/sk | Water Ratio, gal/sk | Slurry Specific Gravity |
|---|---|---|---|---|---|---|---|
| 10 | 0.5 | 0.56 | 0.45 | — | — | 3.99 | 1.92 |
| 11 | 0.5 | 0.56 | 0.45 | — | 0.07 | 3.92 | 1.92 |
| 12 | 0.5 | 0.56 | 0.45 | 0.08 | — | 3.92 | 1.92 |
| 13 | 0.75 | 0.56 | 0.45 | 0.08 | — | 4.47 | 1.92 |
| 14 | 1.0 | 0.56 | 0.45 | 0.08 | — | 3.89 | 1.92 |

[1]Polymeric additive disclosed in U.S. Pat. No. 4,557,763 issued December 10, 1985.
[2]All percentages are by weight of dry cement.
[3]Copolymer of AMPS ® and N,N-dimethylacrylamide.
[4]Gallons per 96 pound sack of cement.
[5]Contains silicic acid particles of 500 m$^2$/g ave. spec. surface area in an amount of 15% silica by weight.
[6]40% by weight aqueous lignosulfonate solution.
[7]Copolymer of AMPS ® and acrylic acid.

TABLE V

| Test Cement Slurry No. | Temp., °F. | Fann Readings at rpm | | | | | | | | | Gel Strength | |
|---|---|---|---|---|---|---|---|---|---|---|---|---|
| | | 300 | 200 | 180 | 100 | 90 | 60 | 30 | 6 | 3 | 10 sec | 10 min |
| 10 | 77 | — | — | — | — | — | — | — | — | — | — | — |
| 11 | 77 | 100 | 76 | 71 | 48 | 45 | 36 | 25 | 16 | 15 | 33 | 111 |
| 12 | 77 | 141 | 111 | 106 | 76 | 73 | 61 | 47 | 39 | 35 | 41 | 65 |
| 13 | 77 | 107 | 81 | 76 | 53 | 50 | 40 | 30 | 21 | 19 | 29 | 45 |
| 14 | 77 | 84 | 63 | 59 | 40 | 38 | 31 | 22 | 14 | 13.5 | 20 | 31 |

TABLE VI

| Test Cement Slurry No. | Thickening Time, hrs:mins | Fluid Loss, ml/30 min | Free Water, % |
|---|---|---|---|
| 10 | 1:26 | — | — |
| 11 | — | 88 | 0 |
| 12 | 2:59 | 100 | 0 |
| 13 | — | 98 | — |
| 14 | 3:43 | 117 | 0 |

EXAMPLE 2

Additional test slurries of the present invention were prepared in accordance with the procedure given in Example 1 above, the components and quantities of which are set forth in Table IV. Rheology and gel strength tests performed using the slurries are given in Table V below and thickening time, fluid loss and free water tests at a BHCT of 77° F. are set forth in Table VI.

EXAMPLE 3

Additional test slurries were prepared in accordance with the procedure set forth in Example 1, the components and quantities of which are given in Table VII below.

TABLE VII

| Test Cement Slurry No. | Dispersant[1], %[2] | Fluid Loss Control Additive[3], % | Aqueous Colloidal Silicic Acid Suspension[4], gal/sk[5] | Set Retarder[6], gal/sk | Water Ratio, gal/sk | Slurry Specific Gravity |
|---|---|---|---|---|---|---|
| 15 | — | 0.7 | 1.0 | 0.14 | 11.2 | 1.5 |

TABLE VII-continued

| Test Cement Slurry No. | Dispersant[1], %[2] | Fluid Loss Control Additive[3], % | Aqueous Colloidal Silicic Acid Suspension[4], gal/sk[5] | Set Retarder[6], gal/sk | Water Ratio, gal/sk | Slurry Specific Gravity |
|---|---|---|---|---|---|---|
| 16 | — | 0.7 | 1.0 | 0.14 | 11.68 | 1.5 |
| 17 | 0.6 | 0.5 | 0.3 | 0.04 | 4.84 | 1.9 |
| 18 | 0.6 | 0.5 | 0.3 | 0.04 | 4.44 | 1.9 |

[1] Polymeric additive disclosed in U.S. Pat. No. 4,557,763 issued December 10, 1985.
[2] All percentages are by weight of dry cement.
[3] Copolymer of AMPS ® and N,N-dimethylacrylamide.
[4] Contains silicic acid particles of 500 m$^2$/g ave. spec. surface area in an amount of 15% silica by weight.
[5] Gallons per 96 pound sack of cement
[6] 40% by weight aqueous lignosulfonate solution.

The rheologies at 90° F. and the results of thickening time, fluid loss and free water tests at a BHCT of 90° F. are given in Tables VIII and IX below, respectively.

TABLE VIII

| Test Cement Slurry No. | Temp., °F. | Fann Readings at rpm | | | | | | | | |
|---|---|---|---|---|---|---|---|---|---|---|
| | | 300 | 200 | 180 | 100 | 90 | 60 | 30 | 6 | 3 |
| 15 | 90 | 23 | 17 | 16 | 10 | 9.5 | 7 | 4.5 | 4 | 2 |
| 16 | 90 | 29 | 22 | 21 | 14 | 13 | 10 | 7 | 3 | 2 |
| 17 | 90 | 98 | 70 | 64 | 40 | 37 | 27 | 16 | 8 | 4 |
| 18 | 90 | 89 | 63 | 58 | 36 | 33 | 24 | 14 | 9 | 4 |

TABLE IX

| Test Cement Slurry No. | Thickening Time, hrs:mins | Fluid Loss, ml/30 min | Free Water, % |
|---|---|---|---|
| 15 | 7:45 | 46 | 0 |
| 16 | 8:00+ | 66 | 0 |
| 17 | 5:04 | 98 | 0 |
| 18 | 4:20 | 100 | 0 |

EXAMPLE 4

Additional test slurries were prepared in accordance with the procedure set forth in Example 1, the components and quantities of which are set forth in Table X below.

TABLE X

| Test Cement Slurry No. | Dispersant[1], %[2] | Fluid Loss Control Additive[3], % | Aqueous Colloidal Silicic Acid Suspension[5], gal/sk[4] | Set Retarder[6], gal/sk | Water Ratio, gal/sk | Slurry Specific Gravity |
|---|---|---|---|---|---|---|
| 19[7] | — | 0.08 | 1.01 | — | 9.38 | 1.56 |
| 20 | — | 0.56 | 0.45 | 0.14 | 3.87 | 1.92 |
| 21 | 0.25 | 0.56 | 0.45 | 0.14 | 3.86 | 1.92 |
| 22 | 0.50 | 0.56 | 0.45 | 0.08 | 3.90 | 1.92 |
| 23 | 0.50 | 0.56 | 0.45 | 0.11 | 3.87 | 1.92 |
| 24 | 0.50 | 0.56 | 0.45 | 0.14 | 3.84 | 1.92 |
| 25 | 0.75 | 0.56 | 0.45 | 0.14 | 3.83 | 1.92 |

[1] Polymeric additive disclosed in U.S. Pat. No. 4,557,763 issued December 10, 1985.
[2] All percentages are by weight of dry cement.
[3] The aqueous solution of the reaction product of polyethyleneimine and one or more sulfonated organic compounds.
[4] Gallons per 96 pound sack of cement.
[5] Contains silicic acid particles of 500 m$^2$/g ave. spec. surface area in an amount of 15% silica by weight.
[6] Copolymer of AMPS ® and acrylic acid.
[7] Test cement slurry 19 included a fluid loss additive comprised of AMPS ® and N,N-dimethylacrylamide instead of the fluid loss additive described in footnote 3 above and a set retarder comprised of a 40% by weight aqueous lignosulfonate solution instead of that described in footnote 6 above (0.14 gal/sk).

Rheology and gel strength tests at temperatures of 77° F. and 160° F. were conducted on the slurries except for slurry No. 19 which was tested at 150° F. only, and thickening time, fluid loss and free water tests were conducted at a BHCT of 150° F. for slurry No. 19 and at 160° F. for slurries 20–25. The results of these tests are given in Tables XI and XII below.

TABLE XI

| Test Cement Slurry No. | Temp., °F. | Fann Readings at rpm | | | | | | | | | Gel Strength | |
|---|---|---|---|---|---|---|---|---|---|---|---|---|
| | | 300 | 200 | 180 | 100 | 90 | 60 | 30 | 6 | 3 | 10 sec | 10 min |
| 19 | 150 | 32 | 24 | 22 | 15 | 14 | 10 | 7 | 2 | 1 | 2 | 3 |
| 20 | 77 | 104 | 99 | — | 66 | — | — | — | 50 | 55 | 92 | 300+ |
| 20 | 160 | 97 | 73 | 67 | 47 | 43 | 35 | 25 | 15 | 16 | 14 | 104 |
| 21 | 77 | 81 | 63 | 70 | 41 | 45 | 38 | 31 | 11 | 20 | 80 | 300+ |

TABLE XI-continued

| Test Cement Slurry No. | Temp., °F. | Fann Readings at rpm | | | | | | | | | Gel Strength | |
|---|---|---|---|---|---|---|---|---|---|---|---|---|
| | | 300 | 200 | 180 | 100 | 90 | 60 | 30 | 6 | 3 | 10 sec | 10 min |
| 21 | 160 | 80 | 60 | 57 | 38 | 36 | 29 | 20 | 9 | 8 | 9 | 74 |
| 22 | 77 | 70 | 52 | 53 | 31 | 32 | 25 | 17 | 5 | 5 | 9 | 162 |
| 22 | 160 | 45 | 32 | 30 | 19.5 | 18.5 | 13 | 8 | 3 | 2 | 3 | 15 |
| 23 | 77 | — | — | — | — | — | — | — | — | — | — | — |
| 23 | 160 | — | — | — | — | — | — | — | — | — | — | — |
| 24 | 77 | 77 | 60 | 65 | 39 | 42 | 35 | 26 | 10 | 10 | 55 | 300+ |
| 24 | 160 | 80 | 62 | 61 | 41 | 39 | 31 | 22 | 12 | 12 | 10 | 79 |
| 25 | 77 | 53 | 39 | 39 | 22 | 22 | 16 | 10 | 3 | 2 | 4.5 | 158 |
| 25 | 160 | 63 | 47 | 45 | 29 | 28 | 22 | 15 | 6 | 5 | 6 | 79 |

TABLE XII

| Test Cement Slurry No. | Thickening Time, hrs:mins | Fluid Loss, ml/30 min | Free Water, % |
|---|---|---|---|
| 19 | — | 70 | 0 |
| 20 | — | — | — |
| 21 | — | — | — |
| 22 | 4:40 | 58 | 0 |
| 23 | 8:32 | — | — |
| 24 | — | — | — |
| 25 | — | 6 | 0 |

EXAMPLE 5

Additional test slurries of the present invention were prepared in accordance with the procedure described in Example 1, the components and quantities of which are given in Table XIII below.

TABLE XIII

| Test Cement Slurry No. | Fluid Loss Additive[1], gal/sk[2] | Fluid Loss Additive[3], gal/sk | Aqueous Colloidal Silicic Acid Suspension[4], gal/sk | Set Retarder[5], gal/sk | Water Ratio, gal/sk | Slurry Specific Gravity |
|---|---|---|---|---|---|---|
| 26 | — | 0.56 | 0.45 | 0.21 | 3.83 | 1.92 |
| 27 | 0.56 | — | 0.45 | 0.14 | 3.84 | 1.92 |

[1]Copolymer of AMPS ® and N,N-dimethylacrylamide.
[2]Gallon per 96 lb sack of cement.
[3]Aqueous solution of the reaction product of a polyethyleneimine and one or more sulfonated organic compounds.
[4]Contains silicic acid particles of 500 m²/g ave. spec. surface area in an amount of 15% silica by weight.
[5]Copolymer of AMPS ® and acrylic acid.

Rheology and static gel strength tests at 195° F., and thickening time, fluid loss and free water tests at a BHCT of 195° F. were run on the slurries, the results of which are given in Tables XIV and XV below, respectively.

TABLE XIV

| Test Cement Slurry No. | Temp., °F. | Fann Readings at rpm | | | | | | | | | Gel Strength | |
|---|---|---|---|---|---|---|---|---|---|---|---|---|
| | | 300 | 200 | 180 | 100 | 90 | 60 | 30 | 6 | 3 | 10 sec | 10 min |
| 26 | 195 | 34 | 25 | 24 | 15 | 14 | 11 | 6.5 | 2.5 | 1.5 | 3 | 36 |
| 27 | 195 | 39 | 29 | 27 | 17 | 16 | — | 7.5 | 3 | 2 | 3 | 7 |

TABLE XV

| Test Cement Slurry No. | Thickening Time, hrs:mins | Fluid Loss, ml/30 min | Free Water, % |
|---|---|---|---|
| 26 | 4:55 | 32 | 0 |
| 27 | 4:06 | 78 | 0 |

Compressive strength tests were conducted in accordance with the above mentioned API Specification using a number of the test cement slurries described in the preceding examples at various temperatures. The results of these tests are set forth in Table XVI below.

TABLE XVI

| Test Cement Slurry No. | Temp., °F. | Compressive Strength (psi) | | | | | | |
|---|---|---|---|---|---|---|---|---|
| | | 8 hr | 12 hr | 16 hr | 18 hr | 24 hr | 36 hr | 96 hr |
| 2 | 82 | — | 50 | — | 110 | 116 | 235 | 450 |
| 3 | 82 | 80 | 120 | 150 | 180 | 210 | — | — |
| 7 | 77 | — | — | 150 | 215 | 265 | 400 | — |
| 8 | 77 | 40 | 115 | 160 | 190 | 260 | — | — |
| 14 | 77 | 100 | 475 | 800 | 950 | 1250 | 1700 | — |
| 15 | 100 | — | — | — | — | 500 | — | — |
| 16 | 100 | 50 | 130 | 200 | 230 | 300 | — | — |
| 17 | 100 | 100 | 800 | 1250 | 1400 | 1775 | — | — |
| 18 | 100 | — | — | 1650 | — | — | — | — |
| 19 | 150 | 250 | 360 | 440 | 500 | 550 | 650 | — |

TABLE XVI-continued

| Test Cement Slurry No. | Temp., °F. | Compressive Strength (psi) | | | | | | |
|---|---|---|---|---|---|---|---|---|
| | | 8 hr | 12 hr | 16 hr | 18 hr | 24 hr | 36 hr | 96 hr |
| 22 | 160 | — | 1600 | — | — | — | — | — |
| 26 | 195 | — | 2100 | — | 2800 | 3000 | — | — |
| 27 | 195 | — | 1800 | — | 2200 | — | — | — |

From the test results set forth in the above examples it can be seen that the improved cement compositions of the present invention do not readily settle or form free water and they exhibit good gel and compressive strength development properties.

Thus, the present invention is well adapted to attain the ends and advantages mentioned as well as those which are inherent therein. While numerous changes to the invention may be able to be made by those skilled in the art, such changes are encompassed within the spirit of this invention as defined by the appended claims.

What is claimed is:

1. An improved well cement composition comprising water in an amount sufficient to form a pumpable slurry, hydraulic cement and an aqueous colloidal silicic acid suspension wherein the colloidal silicic acid particles in the suspension have a specific surface area in the range of from about 50 $m^2/g$ to about 1000 $m^2/g$, said colloidal silicic acid suspension being present in said composition in an amount in the range of from about 1% to about 30% by weight of dry cement therein.

2. The composition of claim 1 wherein said aqueous colloidal silicic acid suspension contains silicic acid particles, expressed as silica, in an amount in the range of from about 2% to about 60% by weight of said suspension.

3. The composition of claim 2 wherein said hydraulic cement is Portland cement.

4. The composition of claim 1 further comprising a fluid loss control additive present in an amount in the range of from about 0.1% to about 10% by weight of dry cement in said composition.

5. The composition of claim 4 wherein said fluid loss control additive is selected from the group consisting of a graft lignin or lignite polymer, an aqueous solution of the reaction product of polyethyleneimine and one or more sulfonated organic compounds and a copolymer of AMPS ® and N,N-dimethylacrylamide.

6. The composition of claim 1 further comprising a set retarder present in an amount in the range of from about 0.1% to about 10% by weight of dry cement in said composition.

7. The composition of claim 6 wherein said set retarder is selected from the group consisting of lignosulfonate plus tartaric acid and an AMPS ®—acrylic acid copolymer.

8. An improved well cement composition comprising:
   (a) Portland hydraulic cement;
   (b) water present in an amount in the range of from about 30% to about 60% by weight of dry cement in said composition;
   (c) an aqueous colloidal silicic acid suspension wherein the colloidal silicic acid particles in the suspension have a specific surface area in the range of from about 300 $m^2/g$ to about 700 $m^2/g$, said colloidal silicic acid suspension being present in said composition in an amount in the range of from about 1% to about 30% by weight of dry cement therein; and
   (d) a fluid loss control additive selected from the group consisting of a graft lignin or lignite polymer, an aqueous solution of the reaction product of polyethyleneimine and one or more sulfonated organic compounds and a copolymer of AMPS ® and N,N-dimethylacrylamide present in said composition in an amount in the range of from about 0.1% to about 10% by weight of dry cement in said composition.

9. The composition of claim 8 further comprising a set retarder selected from the group consisting of lignosulfonate plus tartaric acid and an AMPS ®—acrylic acid copolymer present in said composition in an amount in the range of from about 0.1% to about 10% by weight of dry cement therein.

10. The composition of claim 8 wherein said colloidal silicic acid suspension contains silicic acid particles, expressed as silica, in an amount in the range of from about 4% to about 30% silica by weight of said suspension, said silicic acid particles have an average size in the range of from about 1 nm to about 10 nm and said colloidal silicic acid suspension is present in said composition in an amount in the range of from about 2% to about 15% by weight of dry cement.

11. The composition of claim 8 wherein said colloidal silicic acid particles have an average specific surface area of about 500 $m^2/g$.

12. The composition of claim 11 wherein said colloidal silicic acid suspension contains silicic acid particles, expressed as silica, in an amount of about 15% silica by weight of said suspension, said silicic acid particles have an average size of about 5.5 nm and said colloidal silicic acid suspension is present in said composition in an amount of about 10% by weight of dry cement.

13. An improved method of cementing in a subterranean zone penetrated by a well bore comprising the steps of:
   forming a pumpable cement composition comprising water, Portland hydraulic cement and an aqueous colloidal silicic acid suspension wherein the colloidal silicic acid particles in the suspension have a specific surface area in the range of from about 50 $m^2/g$ to about 1000 $m^2/g$, said colloidal silicic acid suspension being present in said composition in an amount in the range of from about 1% to about 30% by weight of dry cement therein; and
   pumping said cement composition into said zone by way of said well bore.

14. The method of claim 13 wherein said cement composition is further comprised of a fluid loss control additive selected from the group consisting of a graft lignin or lignite polymer, an aqueous solution of the reaction product of polyethyleneimine and one or more sulfonated organic compounds and a copolymer of AMPS ® and N,N-dimethylacrylamide present in said composition in an amount in the range of from about 0.1% to about 10% by weight of dry cement in said composition.

15. The method of claim 14 wherein said cement composition is further comprised of set retarder selected from the group consisting of lignosulfonate plus tartaric acid and an AMPS ®—acrylic acid copolymer present in an amount in the range of from about 0.1% to about 10% by weight of dry cement in said composition.

16. The method of claim 15 wherein said colloidal silicic acid particles in said suspension have a specific surface area in the range of from about 300 m²/g to about 700 m²/g.

17. The method of claim 16 wherein said colloidal silicic acid suspension contains silicic acid particles expressed as silica, in an amount in the range of from about 4% to about 30% silica by weight of said suspension, said silicic acid particles have an average size in the range of from about 1 nm to about 10 nm and said colloidal silicic acid suspension is present in said composition in an amount in the range of from about 2% to about 15% by weight of dry cement.

18. The method of claim 16 wherein said colloidal silicic acid particles have an average specific surface area of about 500 1m²/g.

19. The method of claim 18 wherein said colloidal silicic acid suspension contains silicic acid particles, expressed as silica, in an amount of about 15% silica by weight of said suspension, said silicic acid particles have an average size of about 5.5 nm and said colloidal silicic acid suspension is present in said composition in an amount of about 10% by weight of dry cement.

* * * * *